United States Patent [19]

Aihara et al.

[11] Patent Number: 5,176,353
[45] Date of Patent: Jan. 5, 1993

[54] POWER SEAT SLIDE DEVICE

[75] Inventors: Tsutomu Aihara; Akihiro Takeda; Isamu Takarabe, all of Yokohama, Japan

[73] Assignee: Ohi Seisakusho Co., Ltd., Yokohama, Japan

[21] Appl. No.: 676,585

[22] Filed: Mar. 27, 1991

[30] Foreign Application Priority Data

Mar. 27, 1990 [JP] Japan .................. 2-31344[U]

[51] Int. Cl.⁵ ............................................. F16M 13/00
[52] U.S. Cl. .................................... 248/430; 248/419
[58] Field of Search .............. 248/430, 429, 424, 416, 248/419, 420, 393; 297/346, 341, 318, 322, 329; 384/18, 19, 50, 34

[56] References Cited

U.S. PATENT DOCUMENTS

| 2,953,190 | 9/1960 | Tanaka | 248/429 |
| 3,279,737 | 10/1966 | Kraus | 248/430 |
| 3,394,912 | 7/1968 | Bullen | 248/430 |
| 4,364,536 | 12/1982 | Kluting | 248/429 |
| 4,717,194 | 1/1988 | Ota et al. | 248/430 X |
| 4,799,802 | 1/1989 | Lautenschlager | 384/19 |
| 4,881,827 | 11/1989 | Borlinghaus et al. | 248/430 X |

FOREIGN PATENT DOCUMENTS

| 0128111A2 | 12/1984 | European Pat. Off. . |
| 0181499A2 | 5/1986 | European Pat. Off. . |
| 0182072A2 | 5/1986 | European Pat. Off. . |
| 0194049A2 | 9/1986 | European Pat. Off. . |
| 0184939 | 8/1987 | Japan | 248/430 |
| 0038047 | 2/1988 | Japan | 248/429 |
| 64-60445 | 3/1989 | Japan . |
| 1431869 | 4/1976 | United Kingdom . |
| 1431870 | 4/1976 | United Kingdom . |
| 1477966 | 6/1977 | United Kingdom . |
| 2193630 | 2/1988 | United Kingdom | 248/429 |
| 2221152A | 7/1988 | United Kingdom . |

Primary Examiner—Karen J. Chotkowski
Attorney, Agent, or Firm—Foley & Lardner

[57] ABSTRACT

Movable and stationary rails are of complementary cross sections, the movable rail being generally C-shaped with grooved side wall portions, the stationary rail having an elongate flat upper plate whose side edge portions constitute guide edge portions. The side edge portions of the stationary rail are spacedly received in the grooved side wall portions of the movable rail. Metal rollers are disposed between major flat portions of the movable and stationary rails. A plastic slider is secured to each of the guide edge portions and so shaped as to be neatly and slidably received in the corresponding grooved side wall portion of the movable rail. The plastic slider has an opening through which an outside edge wall of the guide edge portion is exposed. A metal ball is rotatably received in the opening in such a manner that diametrically opposed ends thereof are contactable with the outside edge wall and an inner surface of the corresponding grooved side wall.

20 Claims, 3 Drawing Sheets

POWER SEAT SLIDE DEVICE

BACKGROUND OF THE INVENTION

1. Field of the Invention

The present invention relates in general to seat slide devices for use in a motor vehicle, and more particularly, to seat slide devices of a power type. More specifically, the present invention is concerned with a power seat slide device which comprises generally stationary rails secured a vehicle floor, movable rails slidably engaged with the stationary rails and carrying thereon a seat, and an electric power unit for driving the movable rails relative to the stationary rails.

2. Description of the Prior Art

In order to clarify the task of the present invention, one conventional power seat slide device will be outlined with reference to FIGS. 5 and 6 of the accompanying drawings, which is disclosed in Japanese Patent First Provisional Publication No. 64-60445.

The power seat slide device of the publication comprises paired (that is, right and left) rail units 1A and 1B which are illustrated in FIGS. 5 and 6 respectively.

As shown, each rail unit 1A or 1B comprises a stationary rail 3 secured to a vehicle floor (not shown) and a movable rail 2 slidably engaged with the stationary rail 3 carrying on a seat (not shown). For achieving the sliding movement of the movable rail 2 relative to the stationary rail 3, the movable rail 2 has at its sides respective downward guide walls 2a by and in which parts 3a of the stationary rail 3 are slidably received. For smoothing the sliding movement of the movable rail 2, a plastic slider 4 is intimately interposed between each guide wall 2a and the corresponding part 3a of the stationary rail 3.

However, due to the inherent construction, this conventional power seat slide device has the following drawbacks.

Since assured and smoothed movement of the movable rails 2 relative to the stationary rails 3 depends greatly on the dimensional condition of the plastic sliders 4, production of such plastic sliders 4 requires a highly skilled molding technique. This increases production cost of the power seat slide device. In fact, if the plastic sliders 4 have poor dimensional condition, undesired play of the movable rails 2 tends to occur during the movement thereof.

SUMMARY OF THE INVENTION

It is therefore an object of the present invention to provide a power seat slide device which is free of the above-mentioned drawbacks.

According to a first aspect of the present invention, there is provided a seat slide device for use in a vehicle having a floor. The device comprises a stationary rail secured to the floor and having an elongate flat upper plate whose side edge portions constitute guide edge portions; a movable rail including an elongate flat upper part and side wall parts which extend downward from lateral sides of the elongate flat upper part to constitute grooved portions which face each other, the movable rail being engaged with the stationary rail in such a manner that the guide edge portions of the stationary rail are spacedly received within the grooved portions of the movable rail respectively; a metal roller disposed between the elongate flat upper plate of the stationary rail and the elongate flat upper part of the movable rail; a plastic slider secured to each of the guide edge portions of the stationary rail, the plastic slider being so shaped as to be neatly and slidably received in the corresponding grooved portion of the movable rail and having one opening through which an outside edge wall of the corresponding guide edge portion of the stationary wall is exposed; and a metal ball rotatably received in the opening having its diametrically opposed ends contactable with the outside edge wall and an inner surface of the corresponding grooved portion.

According to a second aspect of the present invention, there is provided a power seat slide device for use in a motor vehicle having a floor. The device comprises a stationary rail secured to the floor, the stationary rail having an elongate flat upper plate whose side edge portions constitute guide edge portions; a movable rail including an elongate flat upper part and side wall parts which extend downward from lateral sides of the elongate flat upper part to constitute grooved portions which face each other, the movable rail being slidably engaged with the stationary rail in such a manner that the guide edge portions of the stationary rail are spacedly received within the grooved portions of the movable rail respectively; two spaced metal rollers disposed between the elongate flat upper plate of the stationary rail and the elongate flat upper part of the movable rail; a plastic slider secured to each of the guide edge portions of the stationary rail, the plastic slider being so shaped as to be neatly and slidably received in the corresponding grooved portion of the movable rail and having one opening through which an outside edge wall of the corresponding guide edge portion of the stationary wall is exposed; a metal ball rotatably received in the opening having its diametrically opposed ends contactable with the outside edge wall and an inner surface of the corresponding grooved portion; and an electric drive means for driving the movable rail relative to the stationary rail by means of an electric power.

According to a third aspect of the present invention, there is provided a power seat slide device for use in a motor vehicle having a floor. The device comprises first and second rail units which are arranged on the floor to extend in parallel with each other, each rail unit including a stationary rail secured to the floor and having an elongate flat upper plate whose side edge portions constitute guide edge portions; a movable rail including an elongate flat upper part and side wall parts which extend downward from lateral sides of the elongate flat upper part to constitute grooved portions which face each other, the movable rail being engaged with the stationary rail in such a manner that the guide edge portions of the stationary rail are spacedly received within the grooved portions of the movable rail respectively; a metal roller disposed between the elongate flat upper plate of the stationary rail and the elongate flat upper part of the movable rail; a plastic slider secured to each of the guide edge portions of the stationary rail, the plastic slider being so shaped as to be neatly and slidably received in the corresponding grooved portion of the movable rail and having one opening through which an outside edge wall of the corresponding guide edge portion of the stationary wall is exposed; and a metal ball rotatably received in the opening having its diametrically opposed ends contactable with the outside edge wall and an inner surface of the corresponding grooved portion; and an electric drive means for driving both of the first and second rail units in a manner to move the movable rail relative to the stationary rail by means of an electric power.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
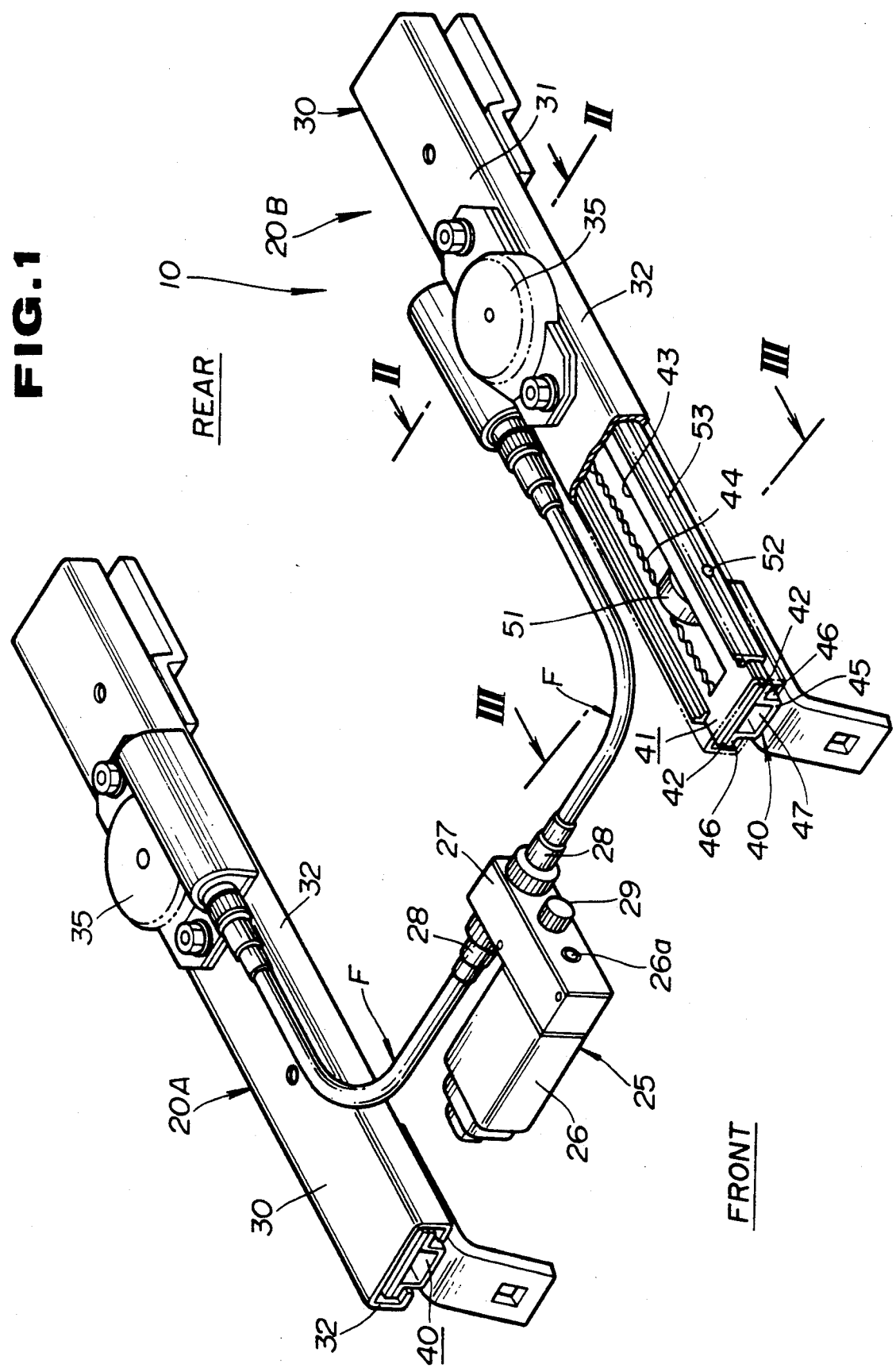
FIG. 1 is a perspective view of a power seat slide device according to the present invention, the device being illustrated with its front part directed leftward.
Figure 2:
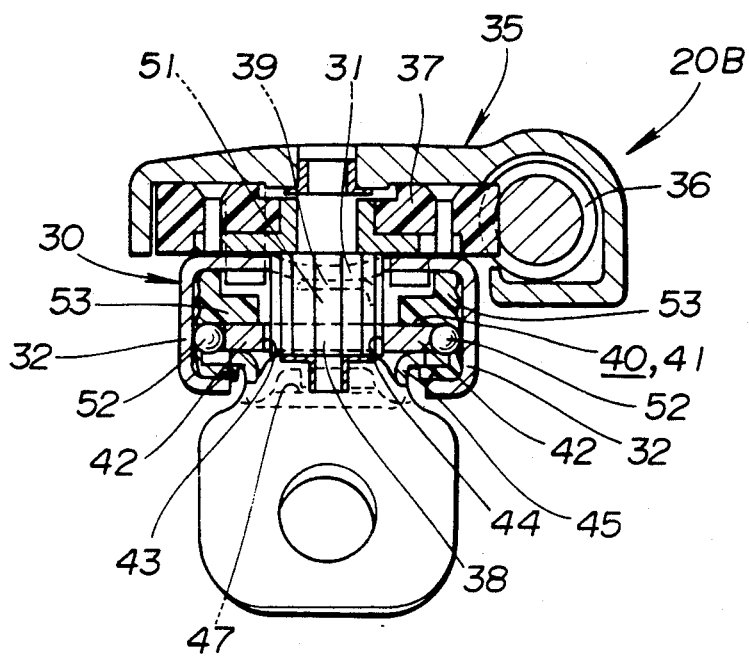
FIG. 2 is a sectional view taken along the line II—II of FIG. 1.
Figure 3:
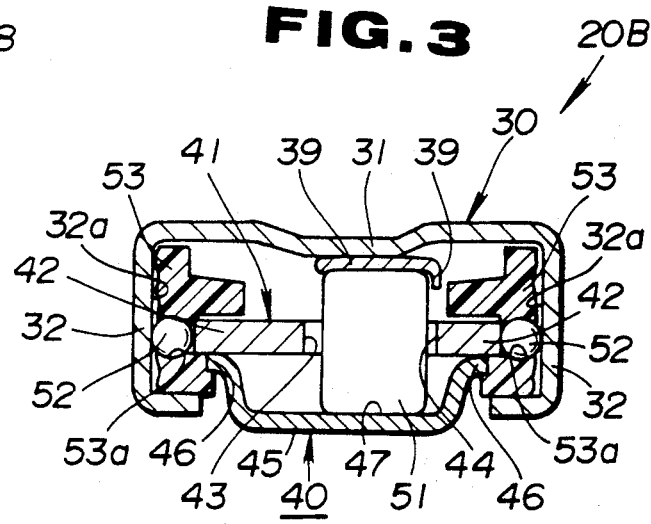
FIG. 3 is a sectional view taken along the line III—III of FIG. 1, showing a movable rail, a stationary rail, rollers, boll bearings and plastic sliders.

Referring to FIGS. 1 to 3, particularly FIG. 1, there is shown a power seat slide device 10 according to the present invention.

The device 10 comprises a pair (that is, right and left) rail units 20A and 20B which are spaced by a distance corresponding to the width of a seat (not shown) which is to be mounted on the device 10. Designated by numeral 25 is an electric power unit which is arranged between the paired rail units 20A and 20B. Flexible cables "F" extend from the power unit 25 to the respective rail units 20.

The paired rail units 20A and 20B have substantially the same constructions but they have a bisymmetrical relationship therebetween. Thus, in the following, the detailed description on the rail units 20A and 20B will be directed to only the left rail unit 20B for facilitation of the description.

The rail unit 20B (or 20A) comprises a stationary rail 40 which is secured to a vehicle floor (not shown) and a movable rail 30 which is slidably engaged with the stationary rail 40 and carries thereon a seat (not shown).

As will be seen from FIG. 1, the electric drive unit 25 comprises an electric reversible motor 26 and a speed reduction gear unit 27. The electric motor 26 is mounted to an end of a housing of the gear unit 27. An output shaft 26a of the electric motor 26 is projected into the housing and rotatably held by the same.

The speed reduction gear unit 27 comprises a set of gears (not shown) the lead one of which is engaged with the output shaft 26a of the electric motor 26 and the tail one of which is connected with both the flexible cables "F". For connecting the flexible cables "F" to the tail gear of the speed reduction gear unit 27, couplers 28 are detachably connected to the housing of the gear unit 27.

Designated by numeral 29 is an annular knob which is fixed to a rotation shaft of an intermediate gear of the gear unit 27. Thus, by manipulating the knob 29, the gears of the gear unit 27 can be rotated.

As will be seen from FIG. 2 which shows a sectional view taken along the line II—II of FIG. 1, the movable rail 30 is constructed to have a generally C-shaped cross section and arranged to direct its channel downward.

That is, the movable rail 30 comprises an elongate flat upper part 31 (see FIG. 1) and side wall parts 32 extending downward from respective side edges of the upper part 31. Designated by numeral 32a in FIG. 3 is a groove which is defined by each of the side wall parts 32.

As is best seen in FIG. 1, mounted on the movable rail 30 is a drive unit 35 to which the flexible cable "F" is led.

As is seen from FIG. 2, the drive unit 35 comprises a worm 36 directly driven by the flexible cable "F", a worm wheel 37 driven by the worm 36, a pinion 38 driven by the worm wheel 37 and a housing (no numeral). The worm wheel 37 comprises a metal base part and a plastic gear part which are coaxially arranged and secured to each other by bolts (no numerals). The pinion 38 is coaxially connected to the worm wheel 37.

As is best shown in FIG. 3, the stationary rail 40 comprises generally an elongate base plate 45 having a depressed Ω-shaped cross section and an elongate flat upper plate 41 welded to tops of side wall parts of the base plate 45.

As is seen from FIG. 2, the elongate base plate 45 has a flat bottom surface 47 which extends longitudinally in parallel with the flat upper part 31 of the movable rail 30.

The elongate flat upper plate 41 of the stationary rail 40 has side edges which constitute guide edge portions 42 for guiding the fore-and-aft movement of the movable rail 30 relative to the stationary rail 40. That is, the guide edge portions 42 are spacedly put in the respective grooves 32a defined by the side wall parts 32 of the movable rail 30.

As is seen from FIG. 1, the elongate flat upper plate 41 of the stationary rail 40 has a longitudinally extending slot 43. An inboard side edge of the slot 43 is formed with teeth which constitute a rack 44 to which the afore-mentioned pinion 38 (see FIG. 2) of the drive unit 35 is operatively engaged.

As is seen from FIG. 3, an elongate contacting plate 39 is fixed to an inner surface of the flat upper part 31 of the movable rail 30 in a manner to extend along the same. An inward side 39a of the contacting plate 39 is bent downward toward the rack 44 of the stationary rail 40 for the purpose which will be clarified hereinafter.

As is seen from FIGS. 1 and 3, front and rear metal rollers 51 are disposed between the stationary and movable rails 40 and 30, more specifically, between the flat bottom surface 47 of the stationary rail 40 and contacting plate 39 of the movable rail 30. Thus, downward load applied to the movable rail 30 is transmitted to the stationary rail 40 through these rollers 51.

It is to be noted that due to provision of the downwardly bent edge 39a of the afore-mentioned contacting plate 39, the rollers 51 are prevented from contacting the rack 44.

As is seen from FIG. 1, each roller 51 has an upper part projected upward through the elongate slot 43 of the stationary rail 40.

As is understood from FIGS. 1 and 3, the guide edge portions 42 of the stationary rail 40 each an an elongate plastic slider 53 tightly connected thereto. Although not shown in the drawings, for achieving the tight connection of the plastic slider 53 with the stationary rail 40, each plastic slider 53 has several projections latchingly fitted in notches formed in the corresponding guide edge portion 42.

If desired, each plastic slider 53 may be divided into two parts, one being for a front-half of the corresponding guide edge portion 42 and the other being for a rear-half of the guide edge portion. With this divided construction, an undesired crack of the plastic slider 53, which may be caused by the differential thermal expansion between hot and cold seasons, is prevented.

As is seen from FIG. 3, the plastic slider 53 is so shaped as to be neatly and slidably received in the groove 32a of the corresponding side wall part 32 of the movable rail 30. Furthermore, the plastic slider 53 has a longitudinally extending channel in which the corresponding guide edge portion 42 is snugly received.

Each plastic slider 53 has at least two openings 53a at front and rear portions thereof, through which an outside wall of the corresponding guide edge portion 42 can be exposed. A metal ball 52 is rotatably received in each opening 53a with an outside portion slightly projected therefrom. Thus, upon assembly, each metal ball 52 is located between the inner surface of the groove 32a of the movable rail 30 and the outside wall of the guide edge portion 42 of the stationary rail 40. Accordingly, lateral load applied to the movable rail 30 is transmitted to the stationary rail 40 through the metal balls 52.

A suitable amount of grease is applied to the rail unit, particularly at portions where friction of parts tend to occur.

In the following, operation will be described. For ease of understanding, the description will be commenced with respect to a condition wherein the motor 26 is at rest.

Under this rest condition, the movable rail 30, on which the seat is mounted, keeps one selected position relative to the stationary rail 40. It is to be noted that due to the nature of the speed reduction gear unit 27 at rest, the position of the movable rail 30 is substantially fixed.

When the motor 26 is energized to run in one or the other direction, the power of the motor 26 is transmitted through the speed reduction gear unit 27 and the flexible cable "F" to the drive unit 35 to rotate the pinion 38 which is meshed with the rack 43 of the stationary rail 40. With the rotation of the pinion 38, the movable rail 30 slides forwardly or rearwardly on and along the stationary rail 40. Upon deenergization of the motor 26, the movable rail 30 stops and thus keeps its new position.

During the sliding movement of the movable rail 30, the rollers 51 roll to run along the flat bottom surface 47 of the stationary rail 40 forward or rearward, while the balls 52 roll to stay within the openings 53a of the plastic sliders 53. Furthermore, during this movement, the downward load and lateral load applied thereto are transmitted to the stationary rail 40 through the metal rollers 51 and metal balls 52, respectively.

Due to provision of the plastic sliders 53 between the stationary and movable rails 40 and 30, the sliding movement of the movable rail 30 is smoothly carried out with a minimum degree of play. Furthermore, even if the metal parts of the rail unit 20B (or 20A) are manufactured with some dimensional errors, the plastic sliders 53 can absorb such errors.

When, due to failure of the electric power unit 25, the motor 26 is not operated even when a control switch (not shown) is turned ON, the following manipulation can be taken for moving the seat (more specifically, the movable rail 30) to a convenient position.

That, is the annular knob 29 is manipulated to turn in one or the other direction. With this, the pinion 38 of the drive unit 35 is rotated and thus, the movable rail 30 is moved, albeit slowly, to a convenient position.

Figure 4:
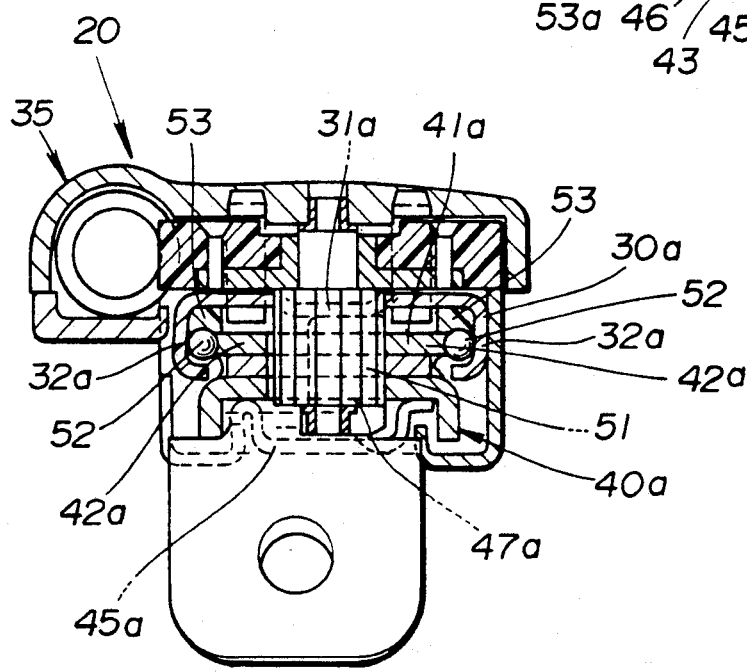
FIG. 4 is a view similar to FIG. 4, but showing a modification of the power seat slide device of the present invention.
Figure 5:
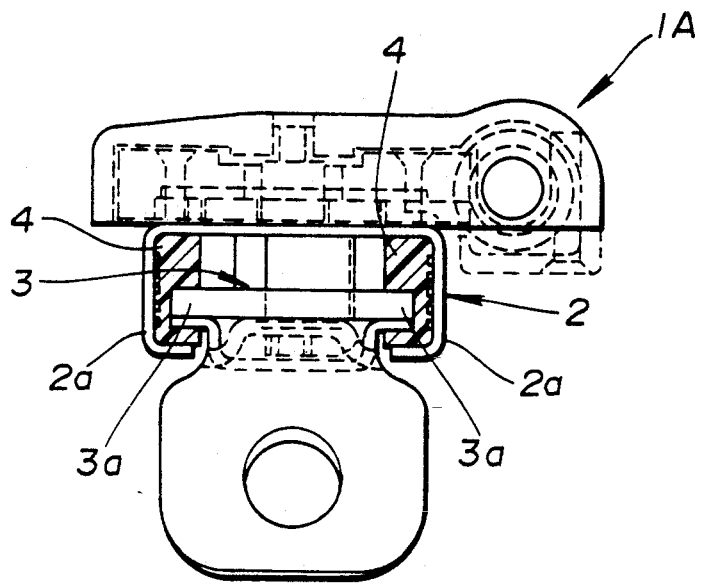
FIGS. 5 and 6 are sectional views of paired (that is, right and left) rail units which are employed in a conventional power seat slide device.
Figure 6:
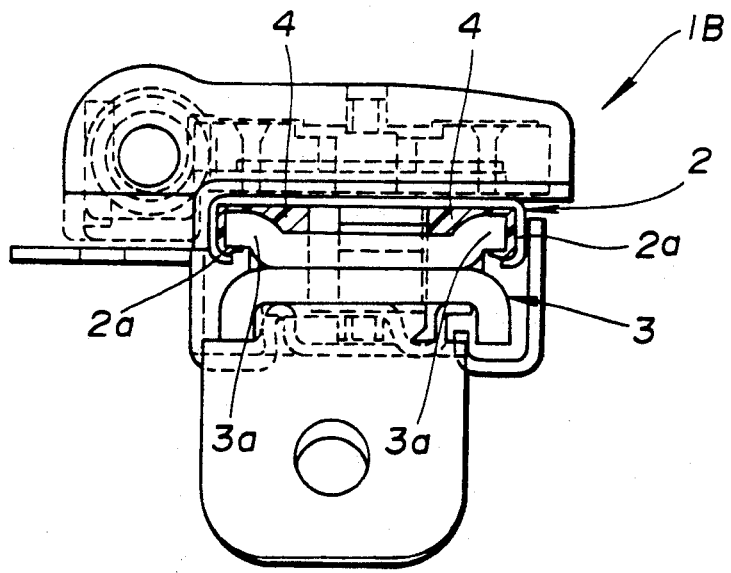

Referring to FIG. 4, there is shown a modification of the power seat slide device of the present invention.

In this modification, the movable and stationary rails 30a and 40a have cross sections which are different from those of the above-mentioned first embodiment. However, similar to the first embodiment, the movable rail 30a comprises comprises an elongate flat upper part 31a and side wall parts 32a extending downward from respective side edges of the upper part 31a. The side wall parts 32a have grooves defined thereby. Furthermore, the stationary rail 40a comprises generally an elongate base plate 45a and an elongate flat upper plate 41a secured to the base plate 45 with an interposal of two reinforcing plates (no numerals) therebetween.

The elongate base plate 45a has a flat bottom surface 47a which extends longitudinally in parallel with the flat upper part 31a of the movable rail 30.

The elongate flat upper plate 41a of the stationary rail 40a has side edges which constitute guide edge portions 42a which are spacedly put in the respective grooves defined by the side wall parts 32a of the movable rail 30a.

Metal rollers 51 and metal balls 52 are arranged in substantially the same manner as in the case of the first embodiment.

In the following, advantages of the present invention will be described.

First, because of provision of the metal balls 52, the lateral load is assuredly received by the stationary rail 40 or 40a. The downward load is transmitted to the stationary rail through the metal rollers 51.

Second, since the sliding movement of the movable rail 30 or 30a relative to the stationary rail 40 or 40a is promoted by three sliding means which are the rollers 51, the balls 52 and the plastic sliders 53, the movement is smoothly achieved. Undesired play of the movable rail is thus suppressed or at least minimized.

What is claimed is:

1. A seat slide device for use in a vehicle having a floor, comprising:
    a stationary rail securable to said floor, said stationary rail having an elongate flat upper plate whose lateral side edge portions constitute guide edge portions, said elongate flat upper plate having a longitudinally extending slot;
    a movable rail including an elongate flat upper part and side wall parts which extend downward from lateral sides of said elongate flat upper part to constitute grooved portions which face each other, said movable rail being engaged with said stationary rail in such a manner that said guide edge portions are spacedly received within said grooved portions;
    metal rollers each being disposed between a bottom surface of said stationary rail and said elongate flat upper part of said movable rail while passing through said longitudinally extending slot;
    a plastic slider secured to each of said guide edge portions of said stationary rail, said plastic slider being so shaped as to be slidably received in the corresponding grooved portion of said movable rail and having an opening through which an outside edge wall of the corresponding guide edge portion of said elongate flat upper plate of said rail is exposed; and a metal ball rotatably received in said opening and having diametrically opposed portions which are contactable with said outside edge wall and an inner surface of the corresponding grooved portion, respectively.

2. A seat slide device as claimed in claim 1, further comprising an electric drive means for driving said movable rail relative to said stationary rail by means of an electric power.

3. A seat slide device as claimed in claim 2, in which said electric drive means comprises:
an electric reversible motor;
a speed reduction gear unit driven by said motor;
a flexible cable driven by said gear unit; and
a drive unit mounted on said movable rail, said drive unit being driven by said flexible cable to move said movable rail axially relative to said stationary rail.

4. A seat slide device as claimed in claim 3, in which said drive unit comprises:
a worm directly driven by said flexible cable;
a worm wheel driven by said worm; and
a pinion driven by said worm wheel and meshed with a rack defined by said stationary rail.

5. A seat slide device as claimed in claim 4, in which said rack is formed on and along a side edge of a longitudinally extending slot formed in said elongate flat upper plate of said stationary rail.

6. A seat slide device as claimed in claim 5, in which said longitudinally extending slot has said metal roller projected upward therefrom.

7. A seat slide device as claimed in claim 6, further comprising an elongate contacting plate which is secured to an inside surface of said elongate flat upper part of said movable rail, said elongate contacting plate having one side edge bent downward toward said rack of said stationary rail to restrict shifting of said metal roller toward said rack.

8. A seat slide device as claimed in claim 7, further comprising grease which is applied to said metal roller, said metal ball and said plastic slider.

9. A seat slide device as claimed in claim 3, in which said speed reduction gear unit has an intermediate gear to which a manually operable knob is connected.

10. A seat slide device as claimed in claim 4, in which said worm wheel comprises:
a metal base part;
a plastic gear part; and
bolts coaxially connecting said metal base part with said plastic gear part.

11. A power seat slide device for use in a motor vehicle having a floor, comprising:
a stationary rail securable to said floor, said stationary rail having an elongate flat upper plate whose lateral side edge portions constitute guide edge portions;
a movable rail including an elongate flat upper part and side wall parts which extend downward from lateral sides of said elongate flat upper part to constitute grooved portions which face each other, said movable rail being slidably engaged with said stationary rail in such a manner that said guide edge portions of said stationary rail are spacedly received within said grooved portions of said movable rail;

two spaced metal rollers disposed between a bottom surface of said stationary rail and said elongate flat upper part of said movable rail;
a plastic slider secured to each of said guide edge portions of said stationary rail, said plastic slider being so shaped as to be slidably received in the corresponding grooved portion of said movable rail and having an opening through which an outside edge wall of the corresponding guide edge portion of said elongate flat upper plate of said stationary rail is exposed;
a metal ball rotatably received in said opening and having diametrically opposed ends contactable with said outside edge wall and an inner surface of the corresponding grooved portion; and
an electric drive unit for driving said movable rail relative to said stationary rail by means of electric power.

12. A power seat slide device for use in a motor vehicle having a floor, comprising:
first and second rail units which are arranged on said floor to extend in parallel with each other, each rail unit including a stationary rail securable to said floor and having an elongate flat upper plate whose side edge portions constitute guide edge portions, said elongate flat upper plate having a longitudinally extending slot; a movable rail including an elongate flat upper part and side wall parts which extend downward from lateral sides of said elongate flat upper part to constitute grooved portions which face each other, said movable rail being engaged with said stationary rail in such a manner that said guide edge portions of said stationary rail are spacedly received within said grooved portions of said movable rail, metal rollers each being disposed between a bottom surface of said stationary rail and said elongate flat upper part of said movable rail while passing through said longitudinally extending slot; a plastic slider secured to each of said guide edge portions of said stationary rail, said plastic slider being so shaped as to be slidably received in the corresponding grooved portion of said movable rail and having an opening through which an outside edge wall of the corresponding guide edge portion of said elongate flat upper plate of said stationary rail is exposed; and a metal ball rotatably received in said opening and having diametrically opposed ends contactable with said outside edge wall and an inner surface of the corresponding grooved portion; and
electric drive means for driving both of said first and second rail units in a manner to move said movable rail relative to said stationary rail by means of electric power.

13. A power seat slide device as claimed in claim 12, in which said electric drive means comprises:
an electric reversible motor;
a speed reduction gear unit driven by said motor;
two flexible cables driven by said gear unit; and
two drive units respectively mounted on the movable rails of said first and second rail units, each drive unit being driven by the corresponding flexible cable to move the corresponding movable rail axially relative to said stationary rail.

14. A power seat slide device as claimed in claim 13, in which each of said drive units comprises:
a worm directly driven by said flexible cable;
a worm wheel driven by said worm; and a pinion driven by said worm wheel and meshed with a rack defined by said stationary rail.

15. A power seat slide device as claimed in claim 14, in which said rack is formed on and along a side edge of a longitudinally extending slot formed in said elongate flat upper plate of said stationary rail.

16. A power seat slide device as claimed in claim 15, in which said longitudinally extending slot has said metal roller projected upward therefrom.

17. A power seat slide device as claimed in claim 16, further comprising an elongate contacting plate which is secured to an inside surface of said elongate flat upper part of said movable rail, said elongate contacting plate having one side edge bent downward toward said rack of said stationary rail to restrict shifting of said metal roller toward said rack.

18. A power seat slide device as claimed in claim 17, further comprising grease which is applied to said metal roller, said metal ball and said plastic slider.

19. A power seat slide device as claimed in claim 13, in which said speed reduction gear unit has an intermediate gear to which a manually operable knob is connected.

20. A seat slide device for use in a vehicle having a floor, comprising:
 a stationary rail securable to said floor, said stationary rail having an elongate flat upper plate whose side edge portions constitute guide edge portions;
 a movable rail including an elongate flat upper part and side wall parts which extend downward from lateral sides of said elongate flat upper part to constitute grooved portions which face each other, said movable rail being engaged with said stationary rail in such a manner that said guide edge portions of said stationary rail are spacedly received with said grooved portions of said movable rail, respectively;
 metal rollers each being disposed between said stationary rail and said movable rail to smooth the movement of said movable rail relative to said stationary rail;
 metal balls; and
 means, fixed to said stationary rail, for holding said metal balls in such a manner that each of said balls is placed between and contactable with a side edge portion of said elongate flat upper plate of said stationary rail and an inner surface of the corresponding grooved portion of said movable rail.

* * * * *